US011983370B2

United States Patent
Datta et al.

(10) Patent No.: US 11,983,370 B2
(45) Date of Patent: May 14, 2024

(54) SPHERICAL OR HIGHLY CURVED TOUCH-SENSITIVE SURFACES

(71) Applicant: Apple Inc., Cupertino, CA (US)

(72) Inventors: Supratik Datta, Sunnyvale, CA (US); Karan Jain, Cupertino, CA (US); Zhiyuan Sun, Chicago, IL (US); Ho Hyung Lee, Campbell, CA (US); Da Yu, San Jose, CA (US); Wei Lin, Santa Clara, CA (US); Nathan K. Gupta, San Francisco, CA (US); Chun-Chih Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 16/938,544

(22) Filed: Jul. 24, 2020

(65) Prior Publication Data
US 2021/0089170 A1 Mar. 25, 2021

Related U.S. Application Data

(60) Provisional application No. 62/906,010, filed on Sep. 25, 2019.

(51) Int. Cl.
*G06F 3/044* (2006.01)
*G06F 3/041* (2006.01)

(52) U.S. Cl.
CPC ........ *G06F 3/0446* (2019.05); *G06F 3/04166* (2019.05); *G06F 2203/04102* (2013.01)

(58) Field of Classification Search
None
See application file for complete search history.

(56) References Cited

U.S. PATENT DOCUMENTS 6,841,225 B2  1/2005  Bottari
9,317,140 B2  4/2016  Rosenfeld et al.
(Continued)

FOREIGN PATENT DOCUMENTS

CN  102365698 A  2/2012
CN  105320382 A  2/2016
(Continued)

OTHER PUBLICATIONS

Search Report received for Chinese Patent Application No. 202010961815.1, mailed on Dec. 9, 2023, 5 pages (2 pages of English Translation and 3 pages of Official Copy).

*Primary Examiner* — Krishna P Neupane
(74) *Attorney, Agent, or Firm* — Kubota & Basol LLP

(57) ABSTRACT

A two dimensional touch sensor panel can be thermoformed or curved by another process to a three-dimensional touch sensor panel, and the three-dimensional touch sensor panel can be laminated to a three-dimension surface having a highly curved or spherical shape. In some examples, thermoforming a two-dimensional touch sensor panel into a three-dimensional touch sensor panel can result in strain of the touch electrodes, and can result in non-uniform three-dimensional touch electrodes (distortion of the two-dimensional touch electrode pattern). The strain can be a function of the curved touch-sensitive surface and/or process related mechanical strain from thermoforming. In some examples, a three-dimensional touch sensor panel can be formed with uniform area touch electrodes using a two-dimensional touch sensor panel pattern with non-uniform area touch electrodes in accordance with the strain pattern expected for a given curved surface and thermoforming technique.

18 Claims, 8 Drawing Sheets

(56) References Cited

U.S. PATENT DOCUMENTS

| | | | |
|---|---|---|---|
| 2011/0199286 A1* | 8/2011 | Dziama | G09G 3/001 345/82 |
| 2015/0077350 A1 | 3/2015 | Hinson | |
| 2015/0346889 A1* | 12/2015 | Chen | G06F 3/0412 345/174 |
| 2016/0011689 A1* | 1/2016 | Kim | G06F 3/0443 345/173 |
| 2016/0147375 A1* | 5/2016 | Bok | G06F 3/04166 345/175 |
| 2017/0205957 A1* | 7/2017 | Park | G06F 3/0443 |
| 2019/0102013 A1* | 4/2019 | Hong | G06F 3/0433 |
| 2020/0257156 A1* | 8/2020 | Reeves | G02F 1/133305 |
| 2021/0405816 A1* | 12/2021 | Niu | G06F 3/0443 |

FOREIGN PATENT DOCUMENTS

| | | |
|---|---|---|
| CN | 105630260 A | 6/2016 |
| CN | 105814523 A | 7/2016 |
| CN | 107491201 A | 12/2017 |
| CN | 108958559 A | 12/2018 |
| WO | 2019/052125 A1 | 3/2019 |

* cited by examiner

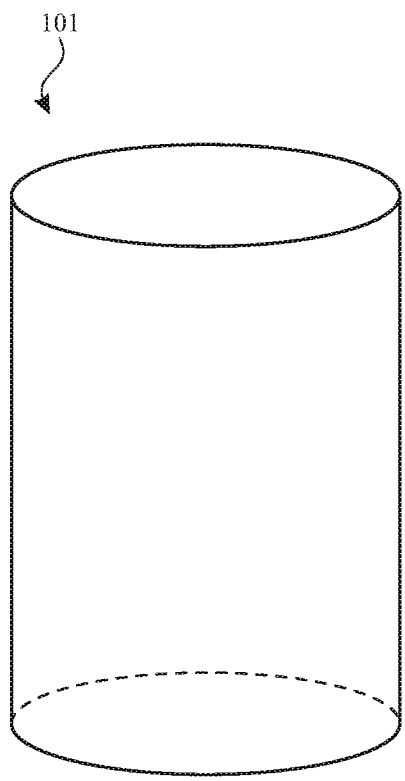
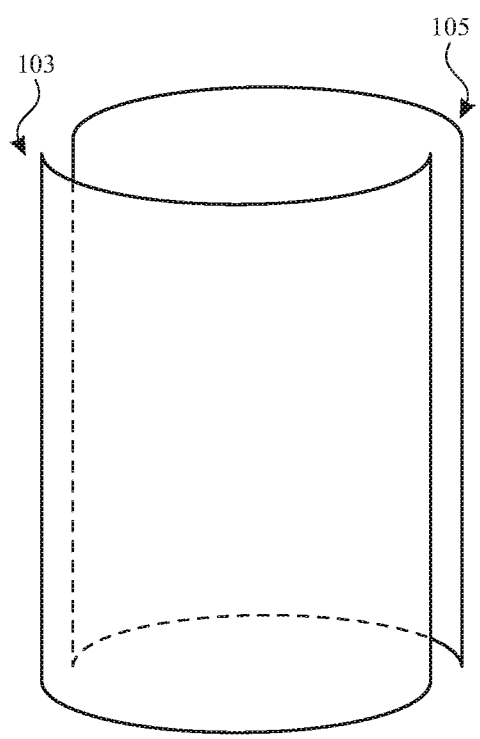
FIG. 1A
FIG. 1B

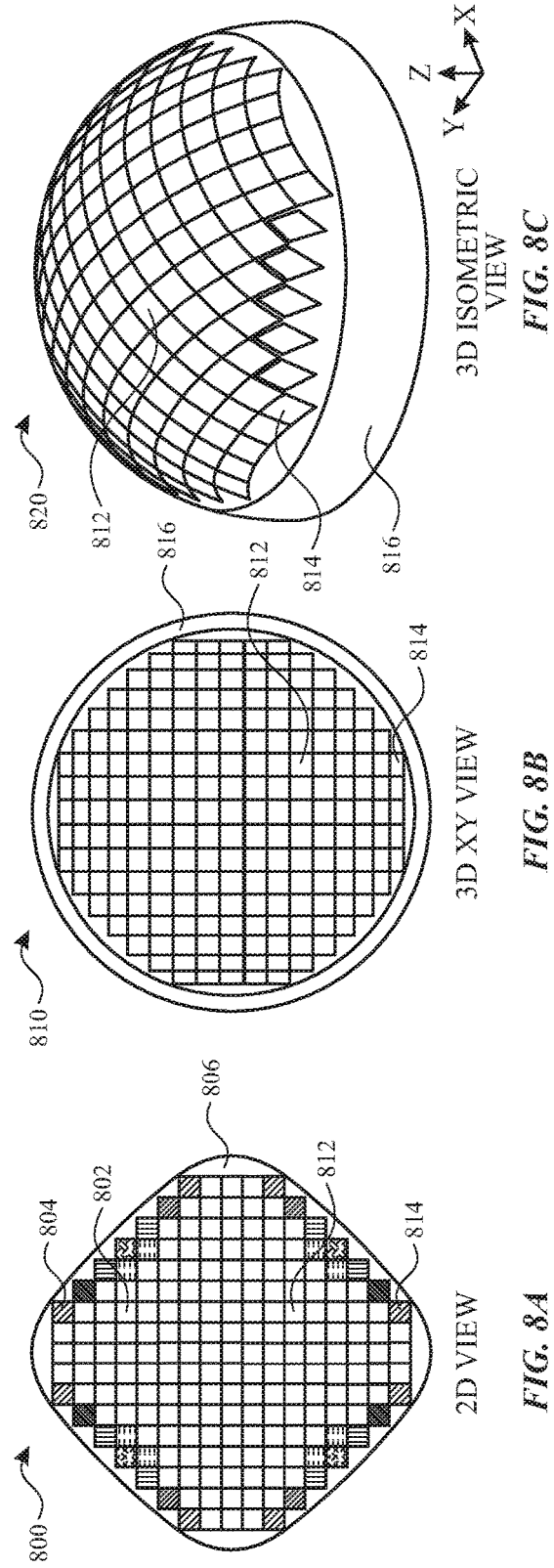
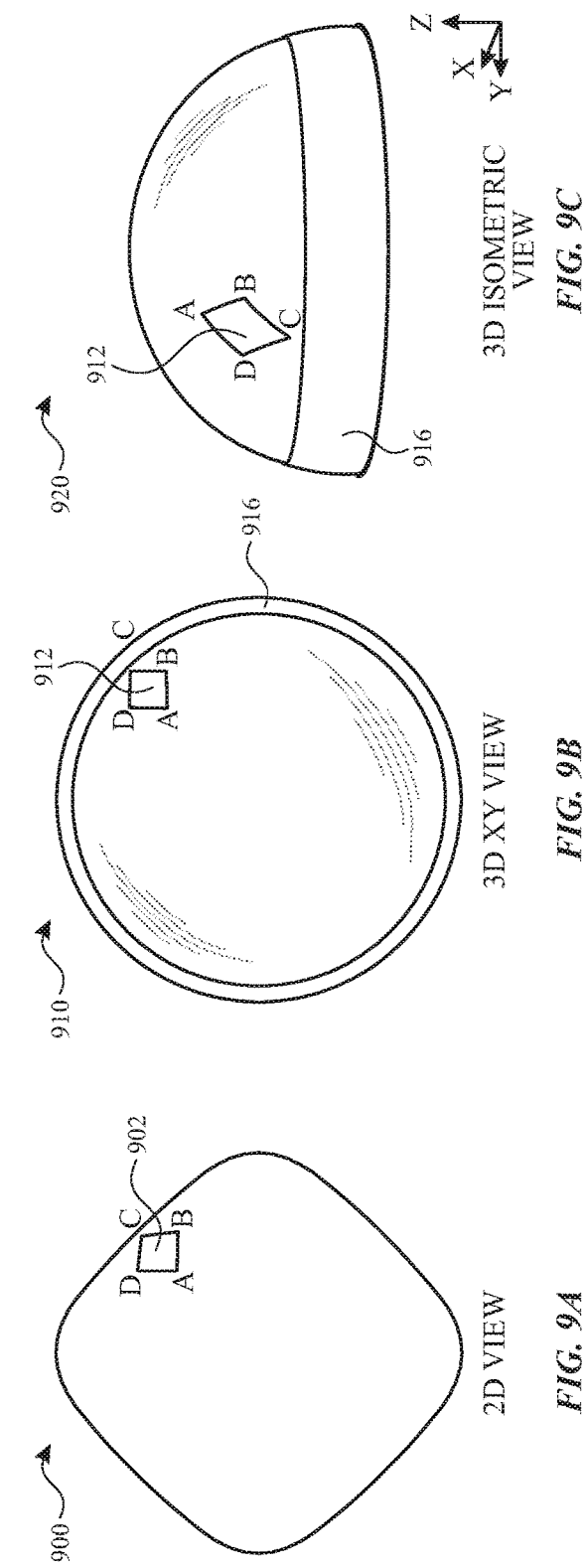

SPHERICAL OR HIGHLY CURVED TOUCH-SENSITIVE SURFACES

CROSS REFERENCE TO RELATED APPLICATIONS

This application claims the benefit of U.S. Provisional Application No. 62/906,010, filed Sep. 25, 2019, the content of which is hereby incorporated by reference in its entirety for all purposes.

FIELD OF THE DISCLOSURE

This relates generally to touch sensors, and more particularly, to spherical or highly curved touch-sensitive surfaces.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates to spherical or highly curved touch-sensitive surfaces. In some examples, a two dimensional touch sensor panel can be thermoformed (or curved by another process) to a three-dimensional touch sensor panel (e.g., with touch electrodes having three-dimensional coordinates), and the three-dimensional touch sensor panel can be laminated to a three-dimension surface (e.g., a shell) having a highly curved shape (e.g., a curvature greater than a threshold). In some examples, thermoforming a two-dimensional touch sensor panel into a three-dimensional touch sensor panel can result in strain of the touch electrodes, and can result in non-uniform three-dimensional touch electrodes (distortion of the two-dimensional touch electrode pattern). The strain can be a function of the curved touch-sensitive surface (e.g., the shape and/or amount of curvature) and/or process related mechanical strain from thermoforming. In some examples, a three-dimensional touch sensor panel can be formed with uniform area touch electrodes using a two-dimensional touch sensor panel pattern with non-uniform area touch electrodes in accordance with the strain pattern expected for a given curved surface and thermoforming technique.

BRIEF DESCRIPTION OF THE DRAWINGS

FIGS. 1A-1B illustrate an example curved surface and one or more curved touch sensor panels according to examples of the disclosure.

FIGS. 8A-8C illustrate a view of a two-dimensional touch sensor panel and three-dimensional views of a curved touch sensor panel according to examples of the disclosure.

FIGS. 9A-9C illustrate a view of a two-dimensional touch sensor panel and three-dimensional views of a curved touch sensor panel according to examples of the disclosure.

DETAILED DESCRIPTION

Figure 2:
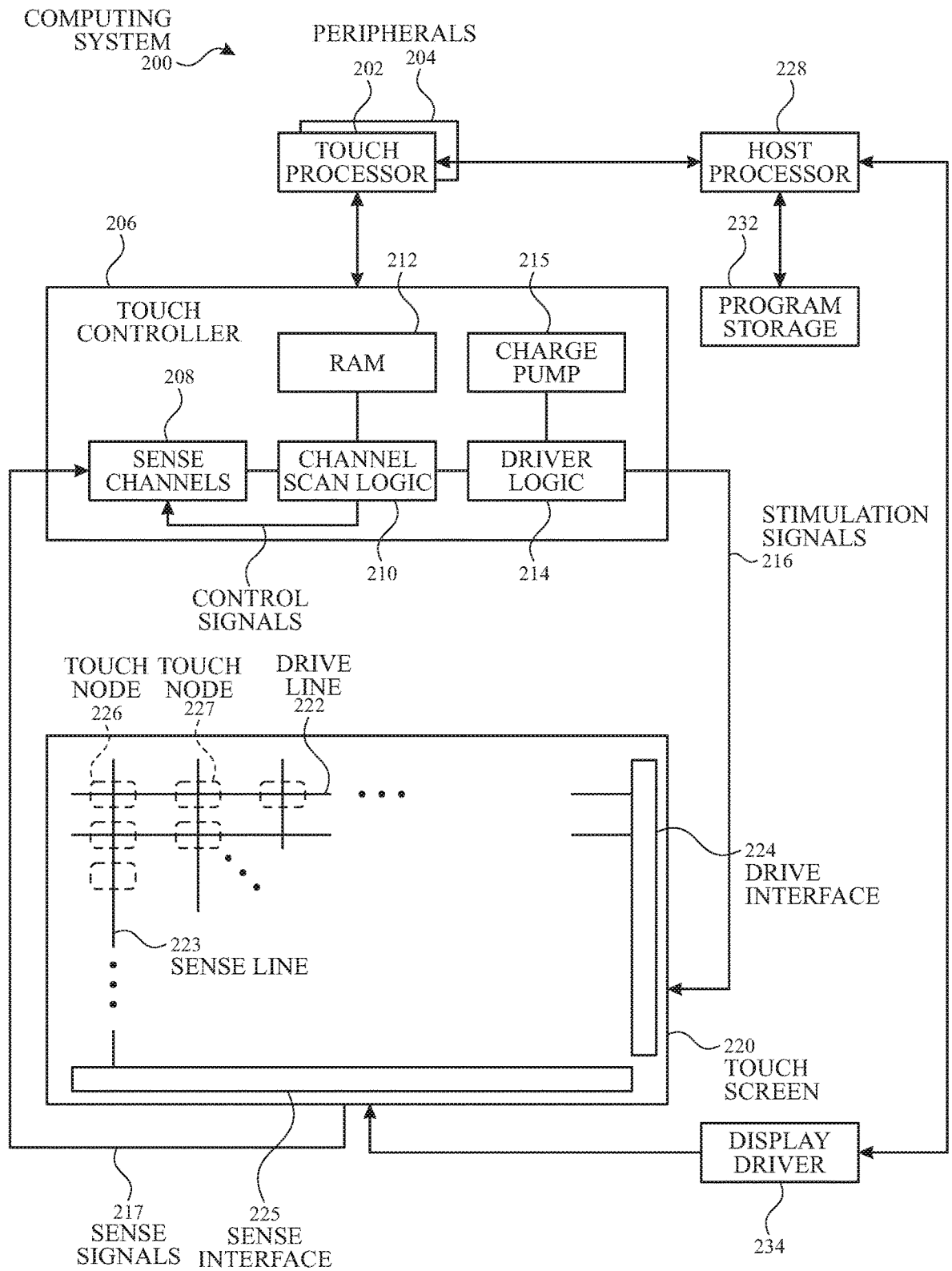
FIG. 2 illustrates an example computing system including a touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to spherical or highly curved touch-sensitive surfaces. In some examples, a two dimensional touch sensor panel can be thermoformed (or curved by another process) to a three-dimensional touch sensor panel (e.g., with touch electrodes having three-dimensional coordinates), and the three-dimensional touch sensor panel can be laminated to a three-dimension surface (e.g., a shell) having a highly curved shape (e.g., a curvature greater than a threshold). In some examples, thermoforming a two-dimensional touch sensor panel into a three-dimensional touch sensor panel can result in strain of the touch electrodes, and can result in non-uniform three-dimensional touch electrodes (distortion of the two-dimensional touch electrode pattern). The strain can be a function of the curved touch-sensitive surface (e.g., the shape and/or amount of curvature) and/or process related mechanical strain from thermoforming. In some examples, a three-dimensional touch sensor panel can be formed with uniform area touch electrodes using a two-dimensional touch sensor panel pattern with non-uniform area touch electrodes in accordance with the strain pattern expected for a given curved surface and thermoforming technique.

As described herein, two-dimensional and three-dimensional refer to whether a touch electrode can be disposed conceptually on a two-dimensional plane or a three-dimensional surface. For example, the vertices of a two-dimensional touch electrode can be defined by two dimensional coordinates (e.g., x, y) to be deposited on a planar surface of a substrate even though physically the touch electrodes have a third dimension (e.g., z). Such a two-dimensional touch electrode would require deforming the touch electrode to be deposited on a curved surface. The vertices of a three-dimensional touch electrode can be defined by three-dimensional coordinates (e.g., x, y, z; spherical coordinates, etc.) to be deposited on a curved surface of a substrate. Such a three-dimensional touch electrode would require deforming the touch electrode to be deposited on a planar surface.

FIGS. 1A-1B illustrate an example curved surface and one or more curved touch sensor panels according to examples of the disclosure. FIG. 1A illustrates an example cylindrical surface 101, representative of one possible three-dimensional curved surface (e.g., shell) that can include one or more curved touch-sensitive surfaces according to examples of the disclosure. In some examples, a two-dimensional touch sensor panel (e.g., a rectangle) can be thermoformed to form a three-dimensional cylindrical touch sensor panel to be coupled to (e.g., via lamination) to cylindrical surface 101. In some examples, multiple touch sensor panels can be thermoformed and coupled to cylindrical surface 101 to form multiple curved touch-sensitive surfaces. For example, FIG. 1B illustrates two curved touch sensitive surfaces 103 and 105 that can represent half-cylinders. Although two curved touch-sensitive surfaces are shown, it should be understood that different numbers of touch sensor panels can be curved to for different numbers of curved touch-sensitive surfaces. Additionally, although one or more cylindrical touch-sensitive surfaces and one or more cylindrical touch sensor panels are shown in FIGS. 1A-1B, it is understood that other regular or irregular curved surfaces or touch sensor panels can be used (e.g., spherical touch-sensitive surfaces and one or more spherical touch sensor panels). Curved touch-sensitive surfaces can be included in various electronic devices to provide touch-sensitive input to the electronic devices (e.g., via curved touch sensor panels or touch screens).

In some examples, touch sensor panels or touch screens can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch sensor panel or touch screen can include a plurality of individual touch electrodes, each touch electrode identifying or representing a unique location (e.g., a touch node) on the touch screen or touch sensor panel at which touch or proximity is to be sensed, and each touch node electrode being electrically isolated from the other touch node electrodes in the touch screen/panel. Such a touch screen/panel can be referred to as a pixelated self-capacitance touch screen/panel, though it is understood that in some examples, the touch node electrodes of the touch screen/panel can be used to perform scans other than self-capacitance scans on the touch screen (e.g., mutual capacitance scans). During operation, a touch node electrode can be stimulated with a voltage or current (e.g., an alternating current (AC)) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen/panel. In some examples, the touch node electrodes of a self-capacitance based touch system can be formed from rows and columns of conductive material, and changes in the self-capacitance to ground of the rows and/or columns can be detected, similar to above. In some examples, a touch screen/panel can be multi-touch, single touch, projection scan, full-imaging multi-touch, capacitive touch, etc.

In some examples, touch sensor panels or touch screens can be based on mutual capacitance. A mutual capacitance based touch system can include electrodes arranged as drive and sense lines (e.g., as described below with reference to FIG. 4A) that may cross over each other on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen/panel. As described herein, in some examples, a mutual capacitance based touch system can form touch nodes from a matrix of small, individual plates of conductive material.

In some examples, touch sensor panels or touch screens can be based on mutual capacitance and/or self-capacitance. The electrodes can be arranged as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

FIG. 2 illustrates an example computing system including a touch screen according to examples of the disclosure, although it should be understood that the illustrated touch screen 220 (which includes a touch sensor panel) could instead be only a touch sensor panel. Computing system 200 can be included in, for example, an electronic device including a curved touch-sensitive surface. In some examples, computing system 200 can be including in a mobile phone, tablet, touchpad, portable or desktop computer, portable media player, wearable device or any mobile or non-mobile computing device (e.g., in-ear or over-ear headphones, speakers, smart hubs, mouse, keyboard, stylus, servers, watches, fitness trackers, eyeglasses, and/or accessories for the above devices) that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 (e.g., including one or more of sensing circuit 314), channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220 (e.g., to drive line 322 or touch node electrode 302 directly or via touch sensing circuit 314), as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver or more generally, display driver 234. It is understood that although some examples of the disclosure are described with reference to LCD displays, the scope of the disclosure is not so limited and can extend to other types of displays, such as Light-Emitting Diode (LED) displays, including Organic LED (OLED), Active-Matrix Organic LED (AMO-LED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein can be performed by firmware stored in memory (e.g., one of the peripherals 204 in FIG. 2) and executed by touch processor 202 or touch controller 206, or stored in program storage 232 and executed by host processor 228 (e.g., programmed to or configured to based on programs in program storage 232). The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. In some examples, touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch node in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Although FIG. 2 illustrates one touch screen 220, it is understood that a computing system can include one or more touch sensor panels (e.g., controlled by one or more touch controllers similar to touch controller 206), one or more displays (e.g., controlled by one or more display drivers similar to display driver 234), and/or one or more touch screens (e.g., controlled by one or more touch controllers, one or more display drivers or one or more integrated touch and display controllers. As described herein, in some examples, the touch screen or touch sensor panel can have a curved shape.

Figure 3A:
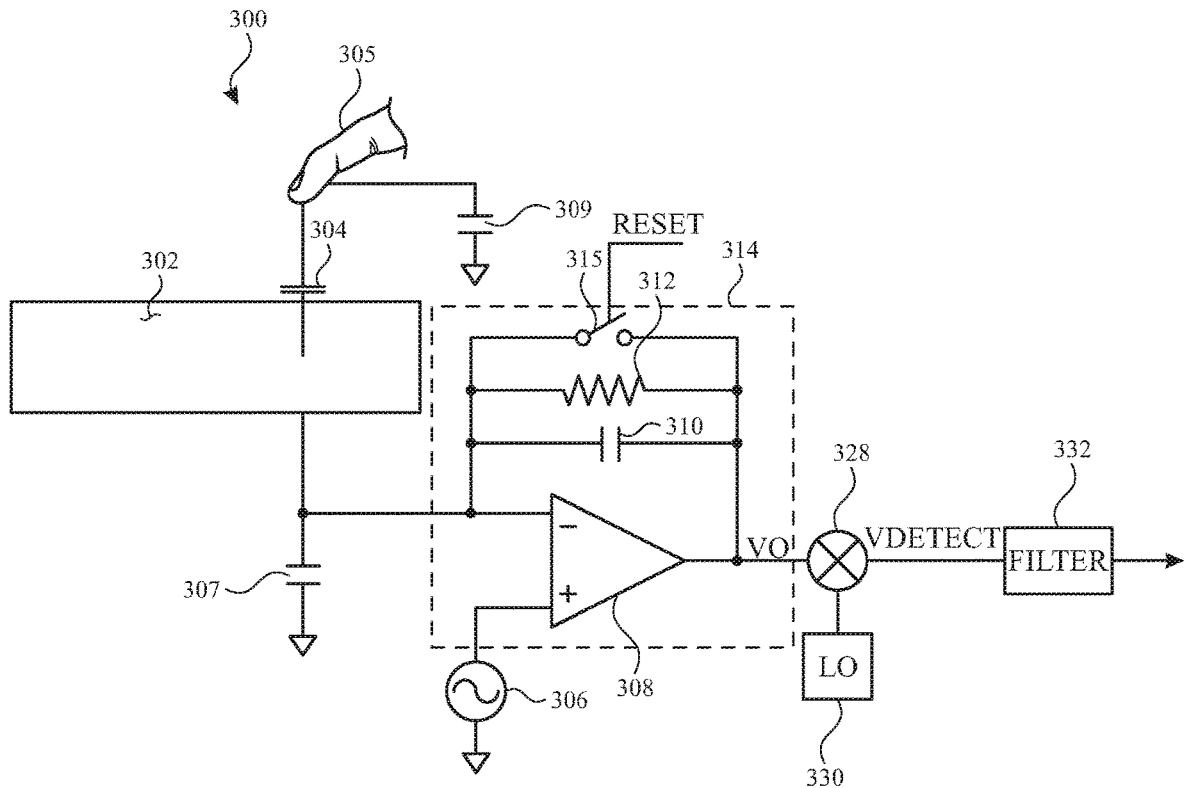
FIG. 3A illustrates an exemplary touch sensor circuit corresponding to a self-capacitance measurement of a touch node electrode according to examples of the disclosure.

FIG. 3A illustrates an exemplary touch sensor circuit 300 corresponding to a self-capacitance measurement of a touch node electrode 302 and sensing circuit 314 (e.g., corresponding to a sense channels 208) according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor (e.g., touch processor 202) to determine the presence of a proximity or touch event, or the output can be inputted into a discrete logic network to determine the presence of a proximity or touch event.

Figure 3B:
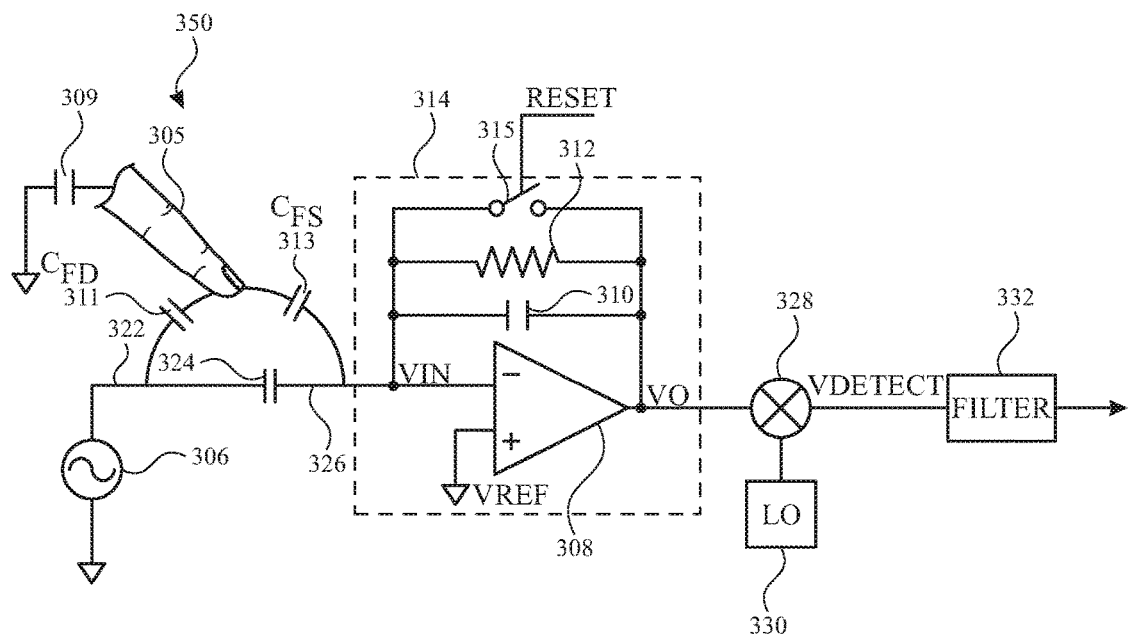
FIG. 3B illustrates an exemplary touch sensor circuit corresponding to a mutual-capacitance drive line and sense line according to examples of the disclosure.

FIG. 3B illustrates an exemplary touch sensor circuit 350 corresponding to a mutual-capacitance drive line 322 and sense line 326 and sensing circuit 314 (e.g., corresponding to a sense channel 208) according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
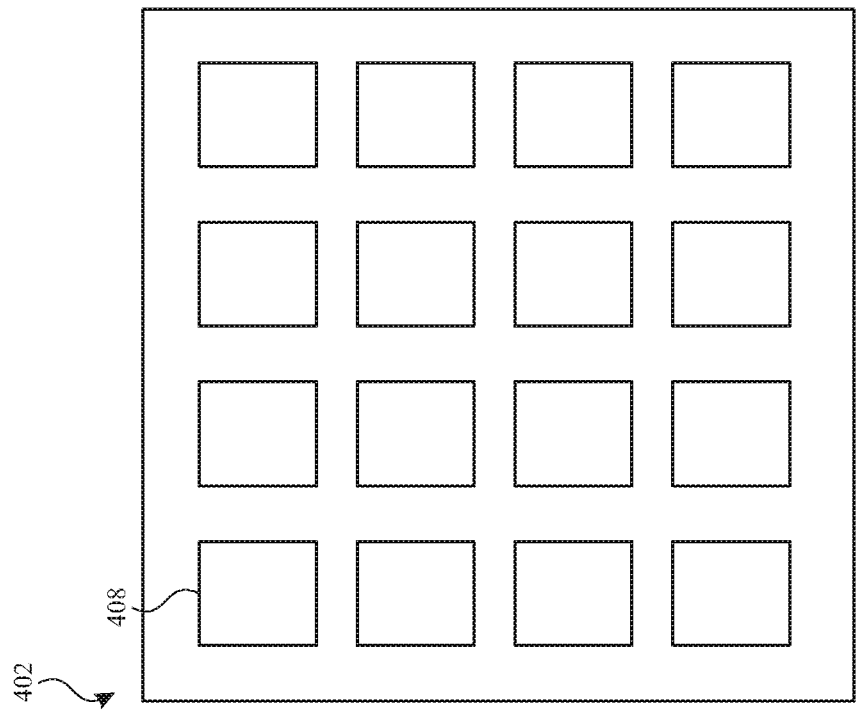
FIG. 4B illustrates a touch screen (or touch sensor panel) with touch node electrodes arranged in a pixelated touch node electrode configuration according to examples of the disclosure.
Figure 4A:
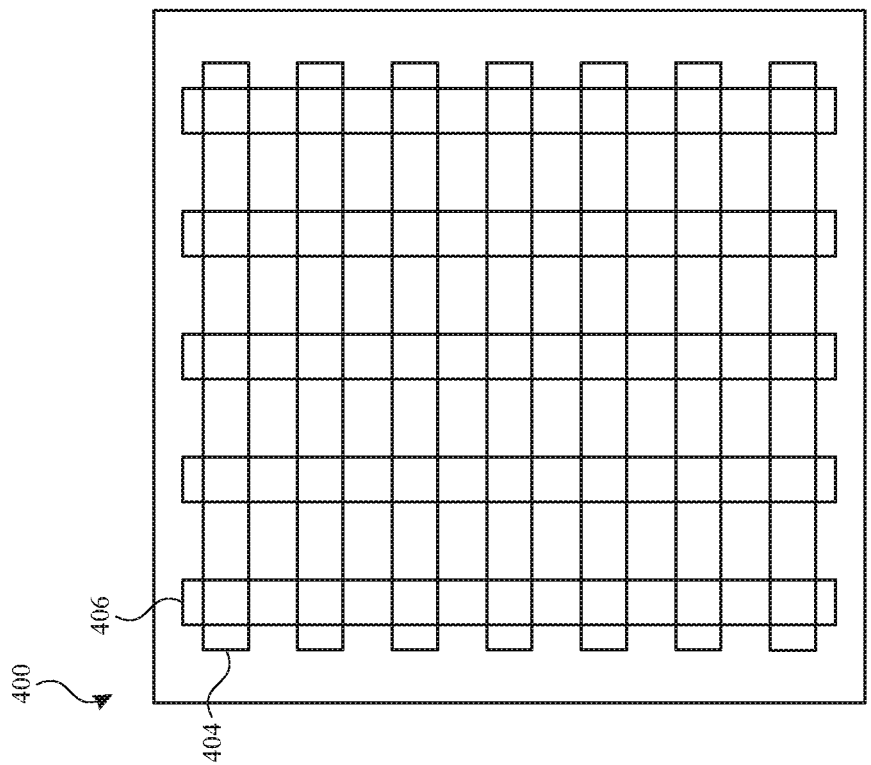
FIG. 4A illustrates a touch screen (or touch sensor panel) with touch electrodes arranged in rows and columns according to examples of the disclosure.

FIG. 4A illustrates touch screen (or touch sensor panel) 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. In some examples, the conductive plates can be formed from other materials including conductive polymers, metal mesh, graphene, nanowires (e.g., silver nanowires) or nanotubes (e.g., carbon nanotubes). Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen (or touch sensor panel) 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 402. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

In some examples, as described herein, the touch-sensitive surface can be a curved surface. In some examples, a two-dimensional touch sensor panel (e.g., a two dimensional pattern of touch electrodes) can be formed and the two-dimensional touch sensor panel can be formed into a three-dimensional touch sensor panel. For example, a thermoforming process can be used to form the two-dimensional touch sensor panel into a three-dimensional touch sensor panel. The three-dimensional touch sensor panel can then be coupled to a three-dimensional curved surface (e.g., in a lamination step). The three-dimensional curved surface can also be referred to herein as a three-dimensional shell. In some examples, the three-dimensional touch sensor panel and shell can have a highly curved shape (curvature greater than a threshold). For example, the three-dimensional touch sensor panel and shell can have a spherical shape. In some examples, the shape can be a sphere. In some examples, the shape can be a spherical cap representing a portion of a sphere cut off by a plane (e.g., hemisphere, ⅓ sphere, ⅙ sphere, etc.). In some examples, the three-dimensional touch sensor panel and shell can have a cylindrical shape (e.g., as illustrated by curved touch-sensitive surfaces 104, 152). It is understood that other shapes are possible including conic shapes, irregular shapes or non-grid shapes that include curved regions.

Figure 5:
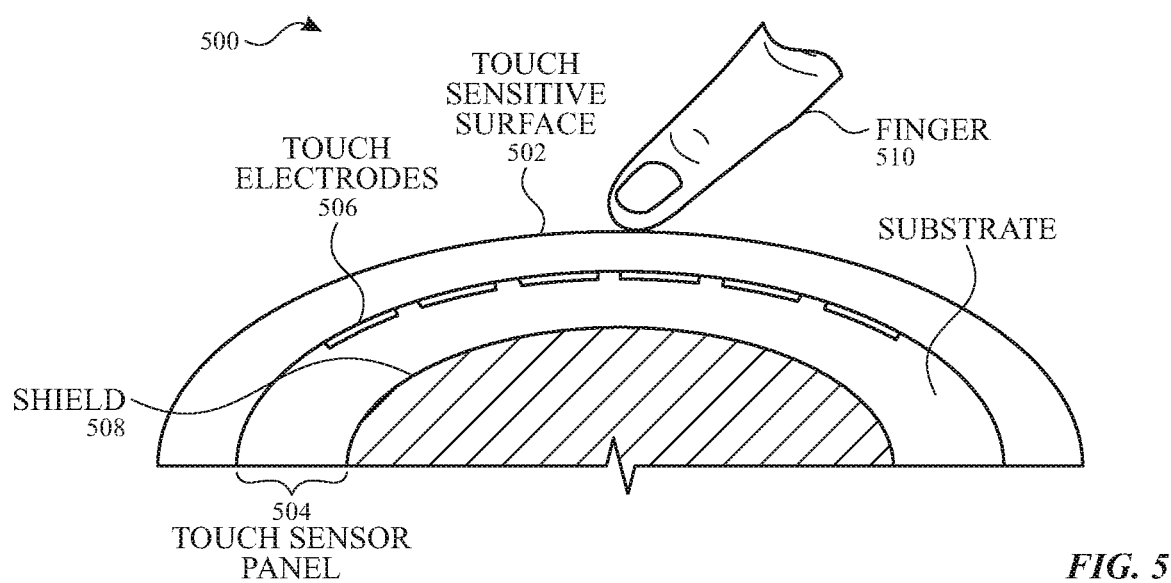
FIG. 5 illustrates an example curved touch-sensitive surface according to examples of the disclosure

FIG. 5 illustrates an example curved touch-sensitive surface according to examples of the disclosure. Touch-sensitive device 500 can include a curved touch-sensitive surface 502 (shell) and curved touch sensor panel 504. Curved touch sensor panel 504 can be thermoformed to fit the shape of curved touch-sensitive surface 502 and can be laminated to curved touch-sensitive surface 502 (e.g., via a pressure sensitive and/or optically clear adhesive). Curved touch sensor panel 504 can be formed by thermoforming a two-dimensional pattern of touch electrodes 506 formed on a substrate 507. In some examples, substrate 507 can be formed of cyclo olefin polymer (COP), polyethylene terephthalate (PET), polycarbonate (PC) or other suitable material. In some examples, touch electrodes 506 can be formed using silver ink or other suitable conductive inks (e.g., copper, carbon-based conductive inks), conductive polymers, metal mesh, graphene, nanowires (e.g., silver nanowires) or nanotubes (e.g., carbon nanotubes). In some examples, touch electrodes 506 and substrate 507 can be flexible to allow for thermoforming without breaking or damaging the touch sensor panel 504. In some examples, touch electrodes can be laser deposited or laser etched on substrate 507.

Touch electrodes 506 of touch sensor panel 504 can be patterned electrodes formed corresponding to the row-column touch electrodes illustrated in FIG. 4A or the pixelated touch electrodes illustrated in FIG. 4B. As described herein, touch from a finger 510 on the touch-sensitive surface 502 can be detected based on the proximity between finger 510 and the touch electrodes 506. In some examples touch-sensitive device 500 can include a shield layer 508 to shield the touch electrodes from other portions of the device represented by the shaded region in FIG. 5 (e.g., from display or other electronic circuitry). Shield layer 508 can be grounded in some examples (or driven to a non-ground bias potential). In some examples, shield layer 508 can be driven with an alternating current signal (e.g., an AC signal corresponding to the drive/stimulation signal used for detecting touch at touch electrodes 506). In some examples, touch electrodes 506 can be formed on one side of substrate 507 and shield layer 508 can be formed on the opposite side of substrate 507 (e.g., one-sided touch sensor panels). In some examples, touch electrodes 506 can be formed on both sides of substrate 507 (e.g., double-sided touch sensor panels), and shield layer 508 can be formed on another substrate or otherwise coupled to touch sensor panel 504.

Figure 6A:
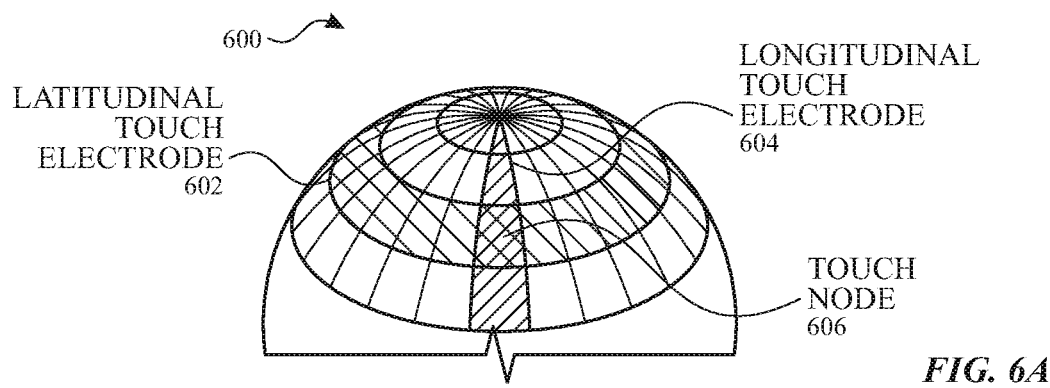
FIGS. 6A-6D illustrate different touch electrode patterns for a curved touch-sensitive surface according to examples of the disclosure.

FIGS. 6A-6D illustrate different touch electrode patterns for a curved touch-sensitive surface according to examples of the disclosure. FIG. 6A illustrates a touch sensor panel formed in a latitude and longitude configuration according to examples of the disclosure. Touch sensor panel 600 can be implemented on a spherical surface, and can include latitudinal touch electrodes 602 (one of which is shaded in FIG. 6A) on a first layer of touch sensor panel 600 and longitudinal touch electrodes 604 (one of which is shaded in FIG. 6A) on a second layer of the touch sensor panel. The first and second layers of the touch sensor panel can be separated by a dielectric layer (e.g., corresponding to substrate 507). In some examples, latitudinal touch electrodes 602 can be "drive lines" and can be configured to be driven/stimulated in a mutual capacitance configuration, and longitudinal touch electrodes 604 can be "sense lines" and can be configured to be sensed in the mutual capacitance configuration. Touch nodes 606 (one of which is shaded in FIG. 6A) can be formed at the overlap of the latitudinal touch electrodes and longitudinal touch electrodes (e.g., corresponding to the overlap of latitudinal touch electrodes 602 and longitudinal touch electrodes 604 shaded in FIG. 6A). In some examples, the latitudinal touch electrodes 602 can be "sense lines" and longitudinal touch electrodes 604 can be "drive lines."

Although illustrated and described as a row-column pattern in a mutual capacitance configuration, it should be understood that a latitude and longitude configuration can be implemented for a pixelated pattern and/or for self-capacitance touch sensing. Individual plates of conductive material (touch electrodes) can be formed in latitude and longitude configuration on a single layer. For example, region corresponding to touch node 606 can represent one individual plate of conductive material (rather than the overlap of portions of a pair of drive/sense lines). Likewise, each individual region of touch sensor panel 600 can correspond to an individual plate of conductive material. The individual plates of conductive material can be driven and sensed to measure a self-capacitance at each of the individual plates, as described herein. Alternatively, the self-capacitance can be measured for each of the longitudinal touch electrodes (columns) and for each of the latitudinal touch electrodes (rows).

Figure 6B:
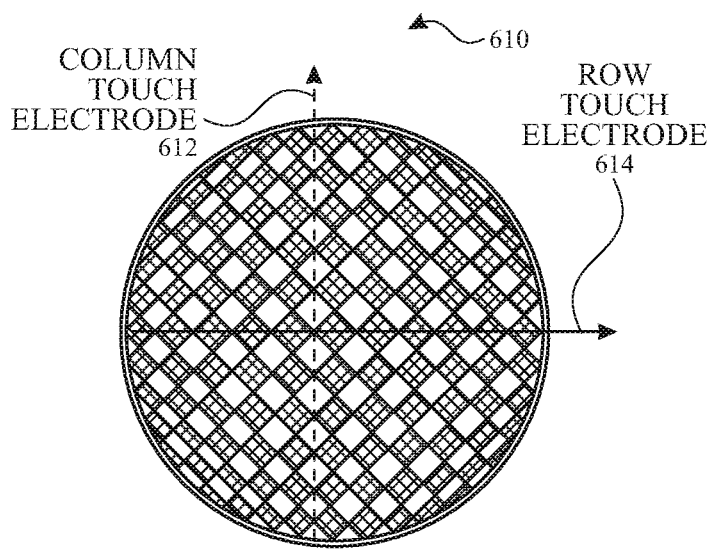

FIG. 6B illustrates a touch sensor panel formed in a diamond configuration according to examples of the disclosure. Touch sensor panel 610 can be implemented on a spherical surface, and can include column touch electrodes 612 (one of which is indicated by dashed arrow through unshaded diamond electrodes in FIG. 6B that can be electrically connected) on a first layer of touch sensor panel 610 and row touch electrodes 614 (one of which is indicated by an arrow through shaded diamond electrodes in FIG. 6B that can be electrically connected) on a second layer of the touch sensor panel. The first and second layers of the touch sensor panel can be separated by a dielectric layer. In some examples, row touch electrodes 614 can be "drive lines" and can be configured to be driven/stimulated in a mutual capacitance configuration, and column touch electrodes 612 can be "sense lines" and can be configured to be sensed in the mutual capacitance configuration. Touch nodes can be formed at the overlap of the column touch electrodes and row touch electrodes. In some examples, the row touch electrodes 614 can be "sense lines" and column touch electrodes 612 can be "drive lines."

Although illustrated and described as a row-column pattern in a mutual capacitance configuration, it should be understood that diamond configuration can be implemented for a pixelated pattern and/or for self-capacitance touch sensing. Individual plates of conductive material (touch electrodes) with a diamond shape can be formed on a single layer. Each diamond-shaped region can represent one individual plate of conductive material. The individual plates of conductive material can be driven and sensed to measure a self-capacitance at each of the individual plates, as described herein. Alternatively, the self-capacitance can be measured for each of the column touch electrodes and for each of the row touch electrodes.

Figure 6C:
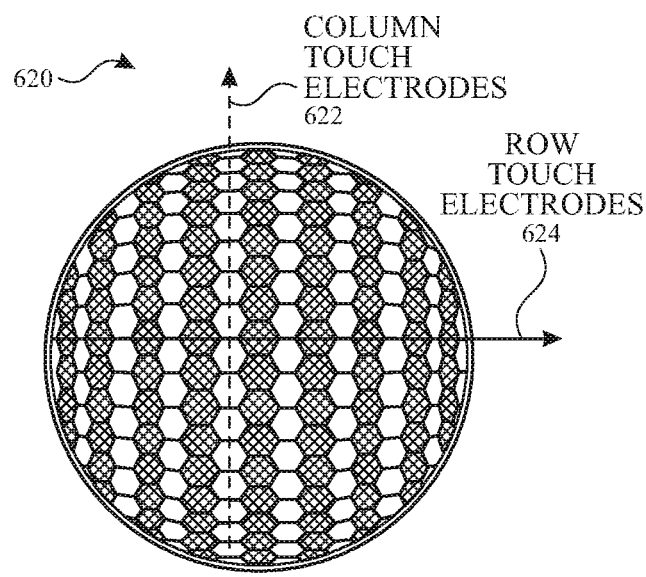

FIG. 6C illustrates a touch sensor panel formed in a hexagonal configuration according to examples of the disclosure. Touch sensor panel 620 can be implemented on a spherical surface, and can include column touch electrodes 622 (one of which is indicated by dashed arrow through unshaded hexagonal electrodes in FIG. 6B that can be electrically connected) on a first layer of touch sensor panel 620 and row touch electrodes 624 (one of which is indicated by an arrow through shaded hexagonal electrodes in FIG. 6B that can be electrically connected) on a second layer of the touch sensor panel. The first and second layers of the touch sensor panel can be separated by a dielectric layer. In some examples, row touch electrodes 624 can be "drive lines" and can be configured to be driven/stimulated in a mutual capacitance configuration, and column touch electrodes 622 can be "sense lines" and can be configured to be sensed in the mutual capacitance configuration. Touch nodes can be formed at the overlap of the column touch electrodes and row touch electrodes. In some examples, the row touch electrodes 624 can be "sense lines" and column touch electrodes 622 can be "drive lines."

Although illustrated and described as a row-column pattern in a mutual capacitance configuration, it should be understood that hexagonal configuration can be implemented for a pixelated pattern and/or for self-capacitance touch sensing. Individual plates of conductive material (touch electrodes) with a hexagonal shape can be formed on a single layer. Each hexagonal-shaped region can represent one individual plate of conductive material. The individual plates of conductive material can be driven and sensed to measure a self-capacitance at each of the individual plates, as described herein. Alternatively, the self-capacitance can be measured for each of the column touch electrodes and for each of the row touch electrodes.

Although a diamond configuration is shown in FIG. 6B and a hexagonal configuration is shown in FIG. 6C, it should be understood that other shapes are possible (e.g., polygons, including pentagons, octagons, etc., and other non-grid shapes).

Figure 6D:
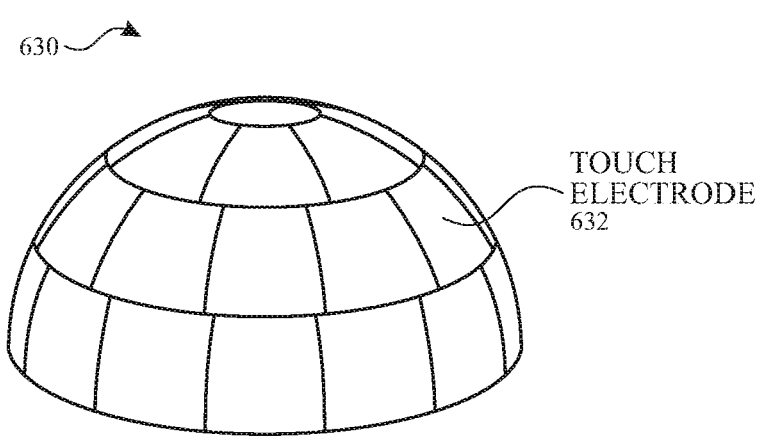

FIG. 6D illustrates a touch sensor panel formed in a staggered quadrilateral configuration according to examples of the disclosure. Touch sensor panel 630 can be implemented on a spherical surface, and can include individual plates 632 of conductive material (touch electrodes) with a quadrilateral shape (excluding the cap of the sphere) that can be formed on a single layer. Each quadrilateral-shaped region (and optionally the cap of the sphere) can represent one individual plate of conductive material. The individual plates of conductive material can be driven and sensed to measure a self-capacitance at each of the individual plates, as described herein.

In some examples, touch electrodes in any of the configurations illustrated in FIGS. 6B-6D can have equal areas. For example, each diamond shaped electrode can be the same area in the configuration of FIG. 6B (e.g., same surface area on the three-dimensional surface). Likewise, each hexagon shaped electrode can be the same area in the configuration of FIG. 6C (e.g., same surface area on the three-dimensional surface), and each quadrilateral shaped electrode can be the same area in the configuration of FIG. 6D (e.g., same surface area on the three-dimensional surface). In some examples, the area can be substantially the same (e.g., within a threshold amount, e.g., 1%, 2%, 5%, etc.) among the touch electrodes in a respective configuration. Uniform area can improve uniformity of the touch signal measured at touch nodes during touch sensing operations. The uniformity of touch signals can allow for simplified touch signal processing algorithms (e.g., uniform signal thresholds) and/or can allow for reduced dynamic range for the sensing circuitry (e.g., for amplifier 308 of sensing circuit 310). Additionally, the hexagonal electrode configuration can improve the uniformity of the grid of touch electrodes over a spherical touch-sensitive surface as compared with a diamond shape electrode configuration.

In some examples, thermoforming a two-dimensional touch sensor panel into a three-dimensional touch sensor panel (e.g., from a planar surface to a curved surface) can result in strain of the touch sensor panel, and can result in non-uniform three-dimensional touch electrodes (distortion of the touch electrode pattern) when thermoforming a touch sensor panel with uniform two-dimensional touch electrodes. The strain can be a function of the curved nature of the touch-sensitive surface and/or processes related mechanical strain from the thermoforming. In some examples, as described herein in more detail, a three-dimensional touch sensor panel can be formed with uniform touch electrodes (e.g., uniform surface area) using a two-dimensional touch sensor panel designed with non-uniform touch electrodes (e.g., non-uniform surface area) in accordance with the strain expected for a given curved surface and thermoforming technique.

Figure 7:
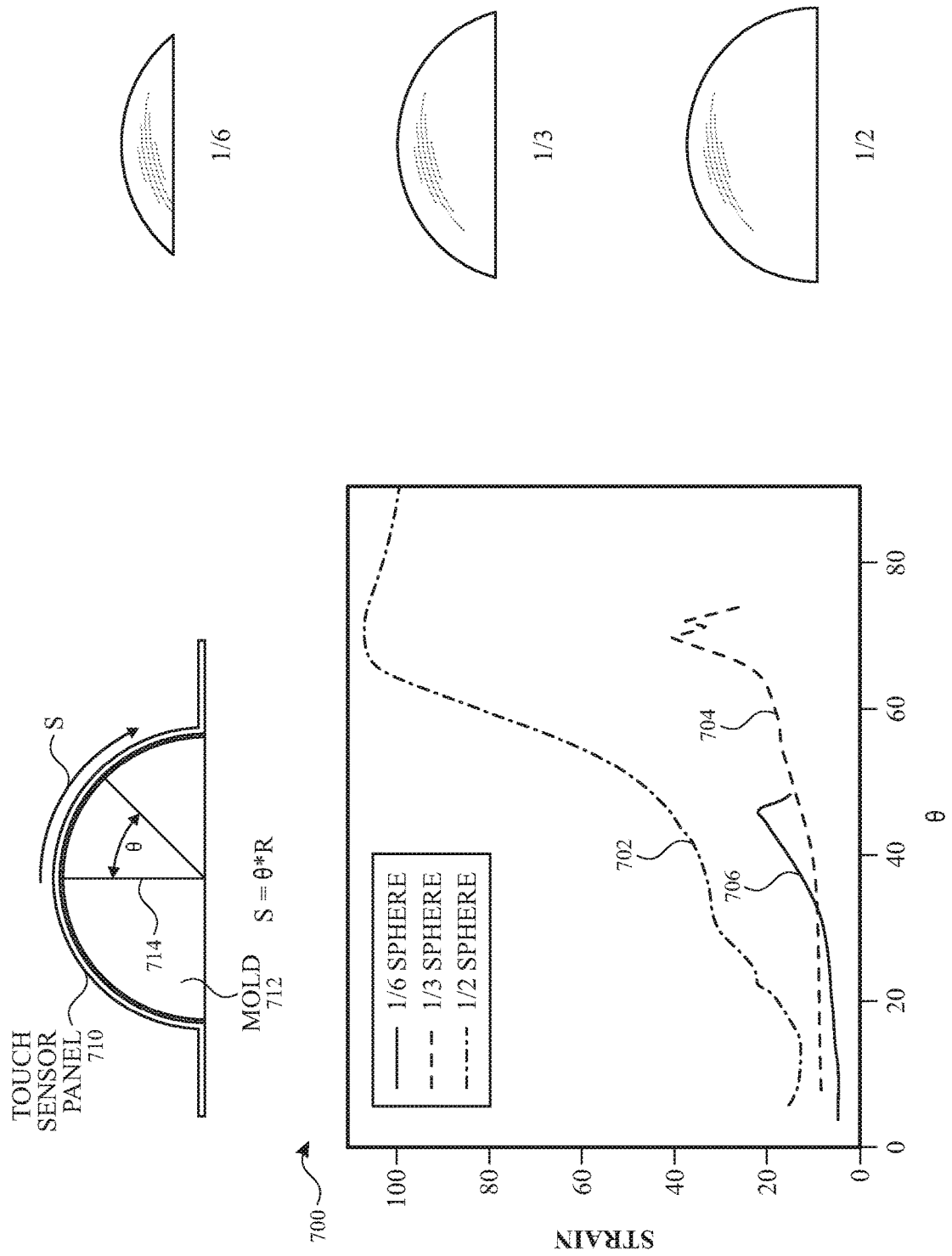
FIG. 7 illustrates an example strain map indicative of the amount of strain as a function of position (angle) for different spherical surfaces according to examples of the disclosure.

FIG. 7 illustrates an example strain map indicative of the amount of strain as a function of position (angle) for different spherical surfaces according to examples of the disclosure. Plot 700 shows strain (radial) as a function of angle for a hemisphere, a third-sphere and a sixth-sphere for a positive-mold thermoforming technique. The positive-mold thermoforming technique can include applying the touch sensor panel 710 to a positive mold 712 with a spherical shape. (A hemisphere can refer to a shape resulting from an intersecting plane through the origin of the sphere. Likewise, a ⅓ sphere can refer to a shape formed from two intersecting planes dividing the sphere into three (where a line through the origin of the sphere is divided into three equal parts by the intersecting planes), and a ⅙ sphere can refer to a shape formed from five intersecting planes dividing the sphere into six (where a line through the origin of the sphere is divided into six equal parts by the intersecting planes).) The strain is represented in FIG. 7 as deformation of a point on the touch sensor panel in the radial direction with respect to its original position on the two-dimensional coordinate system (before deformation), expressed as a percentage (with zero representing no strain) and the azimuthal angle may be represented with respect to a normal line 714 between a point on the spherical shaped touch sensor panel intersecting a tangential plane and the base/intersecting plane of the spherical shaped touch sensor panel parallel to the tangential plane.

As illustrated by plot 700, the strain can be non-uniform and generally may increase as the angle increases and/or as the curvature of the spherical surface increases. For example, curve 702 can correspond to the strain for a ½ sphere, curve 704 can correspond to the strain for a ⅓ sphere, and curve 706 can correspond to the strain for the ⅙ sphere. As illustrated, for each of curves, the strain generally increases as the angle increases. Likewise, as the curvature of the sphere increases, the strain can increased. For example, the strain is greater for a ½ sphere than for a ⅓ sphere or a ⅙ sphere.

It should be understood that plot 700 is representative of specific curved surfaces and thermoforming technique, and that different shaped touch sensor panels and/or different thermoforming techniques can result in different strain map results and therefore different distortion in the touch electrodes of the resulting curved touch sensor panel. In some examples, the strain profile can be measured experimentally using digital image correlation (DIC) or Moiré interferometry (or other suitable measurement techniques), or simulated using mechanical finite element analysis (FEA) (or other suitable simulation techniques) to generate a strain map that maps coordinates from desired location on three-dimensional curved surface to desired coordinates on a two-dimensional sensor pattern such that this two-dimensional sensor pattern can produce the correct three-dimensional sensor pattern after experiencing strain during the thermoforming and/or lamination process.

In some examples, the strain map can be used to generate a two-dimensional touch sensor panel that when thermoformed to a three-dimensional touch sensor panel can have touch electrodes of the same or substantially the same (within a threshold amount) surface area. For example, a three-dimensional touch sensor panel pattern can be designed and the boundaries of the touch electrodes can be defined by a group of points in three-dimensional coordinates (e.g., breaking the boundaries of a touch electrode into a group of discrete points). In some examples, the group of points can include the corners/vertices of the touch electrodes and one or more points in between the corners/vertices. The coordinates can be mapped from three-dimensions to two-dimension using the strain map. The group of points defining the boundaries of the touch electrodes after this mapping can define the boundary of the touch electrodes in two-dimensions (e.g., by reconnecting the points).

In some examples, some curved surfaces and/or thermoforming processes may result in strain maps with less than a threshold amount of strain. For such examples, the area of three-dimensional touch electrodes may remain the same (or within a threshold). For highly curved surfaces and/or for processes with resulting strain maps with a threshold amount of strain, the thermoforming can result in distortion such that three-dimensional touch electrodes non-uniformity of area (outside the threshold). In some examples, to avoid or minimize this distortion, the two-dimensional pattern of touch electrodes can include touch electrodes with scaled dimensions (non-uniform area for some of the touch electrodes) such that resulting strain in forming a three-dimensional touch sensor panel can result in equal area (or substantially equal area) for each touch electrode after thermoforming and lamination. Achieving equal (or substantially equal) area for touch electrodes for the three-dimensional curve touch sensor panel can reduce the complexity of touch sensing algorithms (e.g., a uniform touch threshold can be used) and/or of touch sensing circuitry (e.g., reduced or more efficient use of dynamic range of the sense amplifiers).

In some examples, an iterative process can be used to create a two-dimensional touch electrode pattern. For example, an initial two dimensional pattern and initial strain estimate (e.g., no strain, or another initial estimate of strain) can be used to map the two-dimensional vertices of the touch electrodes (or more points, in some examples) to a three-dimensional surface. The area of the touch electrodes can be computed, and if the areas of the three-dimensional touch electrodes are the same or substantially the same (within a threshold), then the two-dimensional pattern can be used. If the areas of the three-dimensional touch electrodes are not the same or substantially the same (e.g., more than a threshold difference), strains can be computed (e.g., using DIC, Moiré, FEA techniques). The strains can be used to create a modified two-dimensional pattern of touch electrodes. The process can be repeated for the modified two-dimensional pattern. For example, the modified two dimensional pattern of touch electrodes can be mapped to three dimensions and the area of the three-dimensional touch electrodes can be compared. When the areas are the same or substantially the same, the modified two-dimensional pattern of touch electrodes can be used for forming three-dimensional touch sensor panels. When the areas are not the same or substantially the same, the strain can be re-determined and a new modified two-dimensional pattern can be created. This process can be repeated as necessary until the three-dimensional touch electrode areas are the same or substantially the same (meeting the threshold for uniformity of area).

FIGS. 8A-8C illustrate a view of a two-dimensional touch sensor panel and three-dimensional views of a curved touch sensor panel according to examples of the disclosure. FIG. 8A illustrates a touch sensor panel 800 including a two-dimensional pattern of polygonal touch electrodes (e.g., diamond shaped touch electrodes), including touch electrodes 802 and 804, disposed on a substrate 806 (e.g., a flexible, planar substrate). In some examples, due to strain during thermoforming and/or laminating the touch sensor panel to form a curved touch-sensitive surface, touch sensor panel 800 can include two-dimensional touch electrodes having different areas. For example, shaded touch electrodes (such as touch electrode 804) can have one or more areas different than a uniform area of unshaded touch electrodes (such as touch electrode 802). In such cases, the unshaded touch electrodes may experience some or no strain that results in touch electrodes with an area that remains within a threshold of the target three-dimensional touch electrode area. The shaded touch electrodes may experience strain that results in touch electrodes with areas outside a threshold of the target three-dimensional touch electrode area. The dimensions and area of these shaded electrodes can be different according to the strain mapping such that when formed into a three-dimensional touch sensor panel, the touch electrodes can have the same or substantially the same area.

In some examples, the dimensions/area of each of the two-dimensional touch electrodes can be designed according to the strain map to have one or more dimensions/area so that each of the three-dimensional touch electrodes have the same or substantially the same area (e.g., the different two-dimensional areas need not be restricted to the outer touch electrodes as illustrated in FIG. 8A). For example, the dimensions/area of some or each of the respective touch electrode in two dimensions can be adjusted (or set) to meet a target three-dimensional touch electrode area based on the corresponding strain map (for the curved surface and thermoforming/lamination techniques).

FIGS. 8B and 8C illustrate a three-dimensional X-Y (top down) view 810 and a three-dimensional isometric view 820 of touch sensor panel 800 corresponding to a ⅓ sphere thermoformed and laminated to a hemispherical shell 816 (e.g., to an interior or exterior surface of the hemispherical shell). The area of the three-dimensional touch electrodes of the pattern of touch electrodes can be substantially the same. For example, representative touch electrodes 812 and 814 can have the same (or substantially the same) area as a result of the thermoforming and lamination processes despite having different dimensions/areas as two-dimensional touch electrodes (e.g., as shown in FIG. 8A).

Although in some cases it may be preferred for all the touch nodes to have the same area or substantially the same area, in some examples, the techniques described herein to adjust the two dimensional touch sensor pattern can be applied in a more limited manner to reduce the error between the actual three-dimensional touch electrode area and the target three-dimensional touch electrode area, for a subset of the touch electrodes. One way to achieve this result is to adjust the tolerance of the threshold (e.g., to increase the allowed variation in area). In some examples, the subset of touch electrodes can correspond to regions of the three dimensional touch sensor panel that may benefit from improved sensitivity for touch sensing, whereas other regions of the touch sensor panel may not benefit (and therefore its three-dimensional area can diverge (or diverge a greater amount) from the target three-dimensional area without resorting to adjusting the dimensions in the two-dimensional touch sensor panel).

FIGS. 9A-9C illustrate a view of a two-dimensional touch sensor panel and three-dimensional views of a curved touch sensor panel according to examples of the disclosure. FIG. 9A illustrates a view of a substrate 900 (e.g., a flexible, planar substrate) including a two-dimensional polygonal touch electrode 902 (e.g., a diamond shaped touch electrode), having vertices labeled A-D. FIGS. 9B and 9C illustrate a three-dimensional X-Y (top down) view 910 and a three-dimensional isometric view 920 of substrate 900 (corresponding to a ⅓ sphere) thermoformed and laminated to a hemispherical shell 916 (e.g., to an interior or exterior surface of the hemispherical shell). Touch electrode 912 can represent a three-dimensional touch electrode resulting from thermoforming two-dimensional touch electrode 902. Touch electrode 912 can represent a touch region (e.g., a touch-sensitive button or input region) on the surface of shell 916. Although one touch electrode 902/912 is shown in the two/three-dimensional views of FIGS. 9A-9C, it is understood that similar principles can be used to form additional three-dimensional touch electrodes.

As discussed herein, due to strain from thermoforming and/or laminating substrate 900 to form a curved touch-sensitive surface, the size of touch electrode 912 can be different than the size of touch electrode 902. For example, one or more of arc lengths AD, AB, BC, and CD may change due to strain. In some examples, the two dimensional arc lengths can be designed such that the resulting three-dimensional arc lengths can be the same (or substantially the same) length on four sides of the polygon. For example, the strain mapping can be used to determine the location of vertices A, B, C and D in two dimensions to result in a three-dimensional touch electrode with arc lengths that are the same (or within a threshold). Although uniform arc lengths are described above, similar techniques can be used to map the three-dimensional touch electrode to a specific region of the three-dimensional curved surface (to avoid any offset in the location, not just the size of the touch electrode).

Although primarily illustrated and described with respect to cylindrical or spherical shapes, it is understood that other shapes for the curved touch sensor panel are possible including regular or irregular shapes and touch electrodes can be arranged in a grid or non-grid pattern. The curved surface can correspond to a surface of an electronic device. For example, cylindrical touch-sensitive surfaces (e.g., illustrated in FIGS. 1A-1B) can be used to detect touch for a device including a cylindrical shape (e.g., a stylus). For example, a curved touch-sensitive surface (e.g., spherical, cylindrical, irregular) can be implemented in electronic devices including curved surfaces. For example, the curved touch-sensitive surface can be included in electronic including but not limited to, mobile phones, laptop computers, desktop computers, tablet computers, in-ear or over-ear headphones, speakers, smart hubs, input devices (e.g., mouse, keyboard, stylus, etc.), servers, watches, fitness trackers, eyeglasses, and/or accessories for the above devices (e.g., protective cases, etc.). In some examples, the curved touch-sensitive surfaces can be overlaid over or otherwise integrated with a display to form a curved touch screen. In some examples, the curved touch-sensitive surfaces can be implemented as touch sensor panels without a display.

Therefore, according to the above, some examples of the disclosure are directed to a touch-sensitive device. The touch-sensitive device can comprise a spherical surface and a touch sensor panel laminated to the spherical surface. The touch sensor panel can comprise a pattern of touch electrodes disposed on a flexible substrate. The touch sensor panel can be thermoformed to a curved shape corresponding to the spherical surface. A surface area of each touch electrode of the pattern of touch electrodes can be substantially the same. Additionally or alternatively to one or more of the examples disclosed above, in some examples, the touch-sensitive device can include an energy storage device, communication circuitry, and/or a touch controller coupled to the touch electrodes. Additionally or alternatively to one or more of the examples disclosed above, in some examples, the pattern of touch electrodes can comprise diamond-shaped touch electrodes. Additionally or alternatively to one or more of the examples disclosed above, in some examples, the pattern of touch electrodes can comprise hexagon-shaped touch electrodes. Additionally or alternatively to one or more of the examples disclosed above, in some examples, the pattern of touch electrodes can comprise rectangular-shaped touch electrodes. Additionally or alternatively to one or more of the examples disclosed above, in some examples, the pattern of touch electrodes can include first touch electrodes disposed on a first side of the touch sensor panel and second touch electrodes disposed on a second side of the touch sensor panel. Additionally or alternatively to one or more of the examples disclosed above, in some examples, the pattern of touch electrodes can be formed on a first side of the touch sensor panel. Additionally or alternatively to one or more of the examples disclosed above, in some examples, the spherical surface can be a spherical cap. Additionally or alternatively to one or more of the examples disclosed above, in some examples, the spherical cap can be a hemisphere. Additionally or alternatively to one or more of the examples disclosed above, in some examples, the spherical cap can be a ⅓ sphere or a ⅙ sphere. Additionally or alternatively to one or more of the examples disclosed above, in some examples, the spherical surface can have a curvature greater than a threshold curvature such that distortion of a two dimensional pattern of touch electrodes thermoformed to the shape of the spherical surface exceeds a threshold amount of distortion. Additionally or alternatively to one or more of the examples disclosed above, in some examples, the surface area of each of the touch electrode of the pattern of touch electrodes is substantially the same when the surface areas of the touch electrodes are within a threshold amount of a target area for the touch electrodes. Additionally or alternatively to one or more of the examples disclosed above, in some examples, the arc length of each of side of the touch electrodes of the pattern of touch electrodes is substantially the same length.

Some examples of the disclosure are directed to a touch-sensitive device. The touch-sensitive device can comprise a curved surface, wherein the curvature of the curved surfaces is greater than a threshold and a touch sensor panel laminated to the curved surface. The touch sensor panel can comprise a pattern of touch electrodes disposed on a flexible substrate. The touch sensor panel can be thermoformed to a curved shape corresponding to the curved surface. A surface area of each touch electrode of the pattern of touch electrodes can be substantially the same. Additionally or alternatively to one or more of the examples disclosed above, in some examples, the curved surface can comprise a spherical surface (sphere, sphere cap, etc.). Additionally or alternatively to one or more of the examples disclosed above, in some examples, the curved surface can comprise a cylindrical surface. Additionally or alternatively to one or more of the examples disclosed above, in some examples, the pattern of touch electrodes can comprise diamond-shaped touch electrodes. Additionally or alternatively to one or more of the examples disclosed above, in some examples, the pattern of touch electrodes can comprise hexagon-shaped touch electrodes. Additionally or alternatively to one or more of the examples disclosed above, in some examples, the pattern of touch electrodes can comprise rectangular-shaped touch electrodes. Additionally or alternatively to one or more of the examples disclosed above, in some examples, the pattern of touch electrodes can include first touch electrodes disposed on a first side of the touch sensor panel and second touch electrodes disposed on a second side of the touch sensor panel. Additionally or alternatively to one or more of the examples disclosed above, in some examples, the pattern of touch electrodes can be formed on a first side of the touch sensor panel. Additionally or alternatively to one or more of the examples disclosed above, in some examples, the surface area of each of the touch electrode of the pattern of touch electrodes is substantially the same when the surface areas of the touch electrodes are within a threshold amount of a target area for the touch electrodes. Additionally or alternatively to one or more of the examples disclosed above, in some examples, the arc length of each of side of the touch electrodes of the pattern of touch electrodes is substantially the same length. Additionally or alternatively to one or more of the examples disclosed above, in some examples, the curved surface can comprise an irregular shape.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A touch-sensitive device comprising:
 a spherical surface, wherein a curvature of the spherical surface is greater than a threshold curvature; and
 a touch sensor panel laminated to the spherical surface;
 wherein:
  the touch sensor panel comprises a pattern of touch electrodes disposed on a flexible substrate;
  the pattern of touch electrodes when in a flat state including a first two-dimensional touch electrode having a first surface area and a second two-dimensional touch electrode having a second surface area different from the first surface area;
  the touch sensor panel is formed to a curved shape corresponding to the spherical surface such that the pattern of touch electrodes is distorted more than a threshold amount of distortion by the forming; and
  a surface area of each three-dimensional touch electrode of the pattern of touch electrodes when in a curved state, is within a threshold amount of a target surface area for the three-dimensional touch electrodes when the touch sensor panel is in the curved state and formed to the curved shape.

2. The touch-sensitive device of claim 1, wherein the spherical surface comprises a cylindrical surface.

3. The touch-sensitive device of claim 1, wherein the pattern of touch electrodes comprises diamond-shaped touch electrodes.

4. The touch-sensitive device of claim 1, wherein the pattern of touch electrodes comprises hexagon-shaped touch electrodes.

5. The touch-sensitive device of claim 1, wherein the pattern of touch electrodes comprises rectangular-shaped touch electrodes.

6. The touch-sensitive device of claim 1, wherein the pattern of touch electrodes includes first touch electrodes disposed on a first side of the touch sensor panel and second touch electrodes disposed on a second side of the touch sensor panel.

7. The touch-sensitive device of claim 1, wherein the pattern of touch electrodes is formed on a first side of the touch sensor panel.

8. The touch-sensitive device of claim 1, wherein the threshold amount is five percent of the target surface area for the touch electrodes.

9. The touch-sensitive device of claim 1, wherein an arc length of each side of the touch electrodes of the pattern of touch electrodes is within a second threshold amount of a target length for each side of the touch electrodes.

10. A touch-sensitive device comprising:
an energy storage device;
communication circuitry;
a touch controller;
a spherical surface, wherein a curvature of the spherical surface is greater than a threshold curvature; and
a touch sensor panel laminated to the spherical surface;
wherein:
the touch sensor panel comprises a pattern of touch electrodes disposed on a flexible substrate and coupled to the touch controller;
the pattern of touch electrodes when in a flat state including a first two-dimensional touch electrode having a first surface area and a second two-dimensional touch electrode having a second surface area different from the first surface area;
the touch sensor panel is formed to a curved shape corresponding to the spherical surface such that the pattern of touch electrodes is distorted more than a threshold amount of distortion by the forming; and
a surface area of each three-dimensional touch electrode of the pattern of touch electrodes when in a curved state is within a threshold amount of a target surface area for the three-dimensional touch electrodes when the touch sensor panel is in the curved state and formed to the curved shape.

11. The touch-sensitive device of claim 10, wherein the pattern of touch electrodes comprises rectangular-shaped touch electrodes or diamond-shaped touch electrodes.

12. The touch-sensitive device of claim 10, wherein the pattern of touch electrodes comprises hexagon-shaped touch electrodes.

13. The touch-sensitive device of claim 10, wherein the pattern of touch electrodes includes first touch electrodes disposed on a first side of the touch sensor panel and second touch electrodes disposed on a second side of the touch sensor panel.

14. The touch-sensitive device of claim 10, wherein the pattern of touch electrodes is formed on a first side of the touch sensor panel.

15. The touch-sensitive device of claim 10, wherein the spherical surface is a spherical cap.

16. The touch-sensitive device of claim 10, wherein the forming comprises thermoforming.

17. The touch-sensitive device of claim 10, wherein the threshold amount is five percent of the target surface area for the touch electrodes.

18. The touch-sensitive device of claim 10, wherein an arc length of each side of the touch electrodes of the pattern of touch electrodes is within a second threshold amount of a target length for each side of the touch electrodes.

* * * * *